US012725196B2

(12) United States Patent
Ogawa

(10) Patent No.: US 12,725,196 B2
(45) Date of Patent: Sep. 1, 2026

(54) SALES MANAGEMENT APPARATUS, SALES MANAGEMENT METHOD, AND SALES MANAGEMENT SYSTEM

(71) Applicant: NEC Corporation, Tokyo (JP)

(72) Inventor: Youichi Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 18 days.

(21) Appl. No.: 18/730,836

(22) PCT Filed: Mar. 28, 2022

(86) PCT No.: PCT/JP2022/015150
§ 371 (c)(1),
(2) Date: Jul. 22, 2024

(87) PCT Pub. No.: WO2023/187929
PCT Pub. Date: Oct. 5, 2023

(65) Prior Publication Data

US 2025/0095049 A1 Mar. 20, 2025

(51) Int. Cl.

| | |
|---|---|
| ***G06Q 30/0601*** | (2023.01) |
| ***G06F 21/62*** | (2013.01) |
| ***H04L 41/28*** | (2022.01) |

(52) U.S. Cl.
CPC ..... *G06Q 30/0635* (2013.01); *G06F 21/6218* (2013.01); *H04L 41/28* (2013.01)

(58) Field of Classification Search
None
See application file for complete search history.

(56) References Cited

U.S. PATENT DOCUMENTS

| | | | | |
|---|---|---|---|---|
| 2007/0233687 | A1* | 10/2007 | Iwase | G06F 21/608 707/999.009 |
| 2014/0086049 | A1* | 3/2014 | Suonvieri | H04W 28/0268 370/230 |
| 2014/0221002 | A1* | 8/2014 | Kahn | H04W 12/08 455/456.1 |
| 2017/0063614 | A1* | 3/2017 | Hartwig | H04L 41/0883 |
| 2020/0068074 | A1 | 2/2020 | Cai et al. | |

(Continued)

FOREIGN PATENT DOCUMENTS

| | | |
|---|---|---|
| CN | 112350847 A | 2/2021 |
| JP | 2004-274368 A | 9/2004 |

(Continued)

OTHER PUBLICATIONS

International Search Report for PCT Application No. PCT/JP2022/015150, mailed on Jun. 14, 2022.

(Continued)

*Primary Examiner* — Raqiul A Choudhury

(57) ABSTRACT

A sales management apparatus acquires purchase request information. The purchase request information indicates a target network service selected by a target user from among a plurality of network services related to a target event. The sales management apparatus determines a network setting of the target network service, and judges whether the determined network setting can be applied to a target network. In response to the judgement, the sales management apparatus outputs a sales possibility notification indicating whether an access right to the target network service can be sold.

17 Claims, 9 Drawing Sheets

(56) References Cited

U.S. PATENT DOCUMENTS

| | | | | |
|---|---|---|---|---|
| 2020/0265484 | A1* | 8/2020 | Caggiano | H04L 51/10 |
| 2021/0056218 | A1* | 2/2021 | Kurian | G06F 21/602 |
| 2022/0007277 | A1* | 1/2022 | Yu | H04W 60/00 |

FOREIGN PATENT DOCUMENTS

| | | | |
|---|---|---|---|
| JP | 2020-509635 | A | 3/2020 |
| JP | 2021-083058 | A | 5/2021 |
| JP | 2021-149564 | A | 9/2021 |
| JP | 2021-158605 | A | 10/2021 |
| WO | 2021/124750 | A3 | 6/2021 |

OTHER PUBLICATIONS

Office Action for JP Application No. 2024-510743, mailed on Apr. 21, 2026 with English Translation.

* cited by examiner

200

202 204

| SERVICE IDENTIFICATION INFORMATION | NETWORK SETTINGS |
|---|---|
| S0001 | P1=x11, P2=x21, P3=x31,... |
| S0002 | P1=x12, P2=x22, P3=x32,... |
| S0003 | P1=x13, P2=x23, P3=x33,... |
| • • • | • • • |

Fig. 6

SALES MANAGEMENT APPARATUS, SALES MANAGEMENT METHOD, AND SALES MANAGEMENT SYSTEM

This application is a National Stage Entry of PCT/JP2022/015150 filed on Mar. 28, 2022, the contents of all of which are incorporated herein by reference, in their entirety.

TECHNICAL FIELD

The present disclosure relates to a technique for managing sale of an access right to a network service.

BACKGROUND ART

A system for managing sale of an access right (for example, a ticket) to use a particular service has been developed. For example, Patent Literature 1 discloses a system for selling a spectator ticket for a sports game or the like. For example, in Patent Literature 1, a predetermined number of tickets that can be purchased at a discount price are prepared for an organization such as a company. An apparatus according to Patent Literature 1 displays, when a user attempts to purchase the ticket, the number of tickets that can be purchased at a discount price according to the organization to which the user belongs.

Further, Patent Literature 2 and Patent Literature 3 disclose access control in a network. More specifically, Patent Literature 2 discloses admission control in a network slice. Patent Literature 3 discloses a technique of selecting a network slice, based on a service request from user equipment.

CITATION LIST

Patent Literature

Patent Literature 1: Japanese Unexamined Patent Application Publication No. 2021-149564

Patent Literature 2: Japanese Unexamined Patent Application Publication No. 2021-083058

Patent Literature 3: Published Japanese Translation of PCT International Publication for Patent Application, No. 2020-509635

SUMMARY OF INVENTION

Technical Problem

Patent Literature 1 does not refer to a mechanism for judging whether a ticket can be sold to a user. Similarly, Patent Literatures 2 and 3 do not refer to a mechanism for judging whether an access right can be sold to a user. The present disclosure has been made in view of the above-described problem, and an objective thereof is to provide a novel technique for managing sale of an access right to a network service.

Solution to Problem

A sales management apparatus according to the present disclosure includes: determination means for determining a network setting of a target network service, which is a network service selected by a target user, from among a plurality of network services related to an event; judgement means for judging whether the determined network setting is applicable to a target network; and notification means for outputting, in response to the judgement, a sales possibility notification indicating whether an access right to the target network service can be sold.

A sales management method according to the present disclosure is executed by a computer. The sales management method includes: a determination step of determining a network setting of a target network service, which is a network service selected by a target user, from among a plurality of network services related to an event; a judgement step of judging whether the determined network setting is applicable to a target network; and a notification step of outputting, in response to the judgement, a sales possibility notification indicating whether an access right to the target network service can be sold.

A sales management system according to the present disclosure includes: determination means for determining a network setting of a target network service, which is a network service selected by a target user, from among a plurality of network services related to an event; judgement means for judging whether the determined network setting is applicable to a target network; and notification means for outputting, in response to the judgement, a sales possibility notification indicating whether an access right to the target network service can be sold.

Advantageous Effects of Invention

According to the present disclosure, it is providing a novel technique for managing sale of an access right to a network service.

BRIEF DESCRIPTION OF DRAWINGS

FIG. 6 is a diagram illustrating network settings defined for each network service;

EXAMPLE EMBODIMENT

Figure 1:
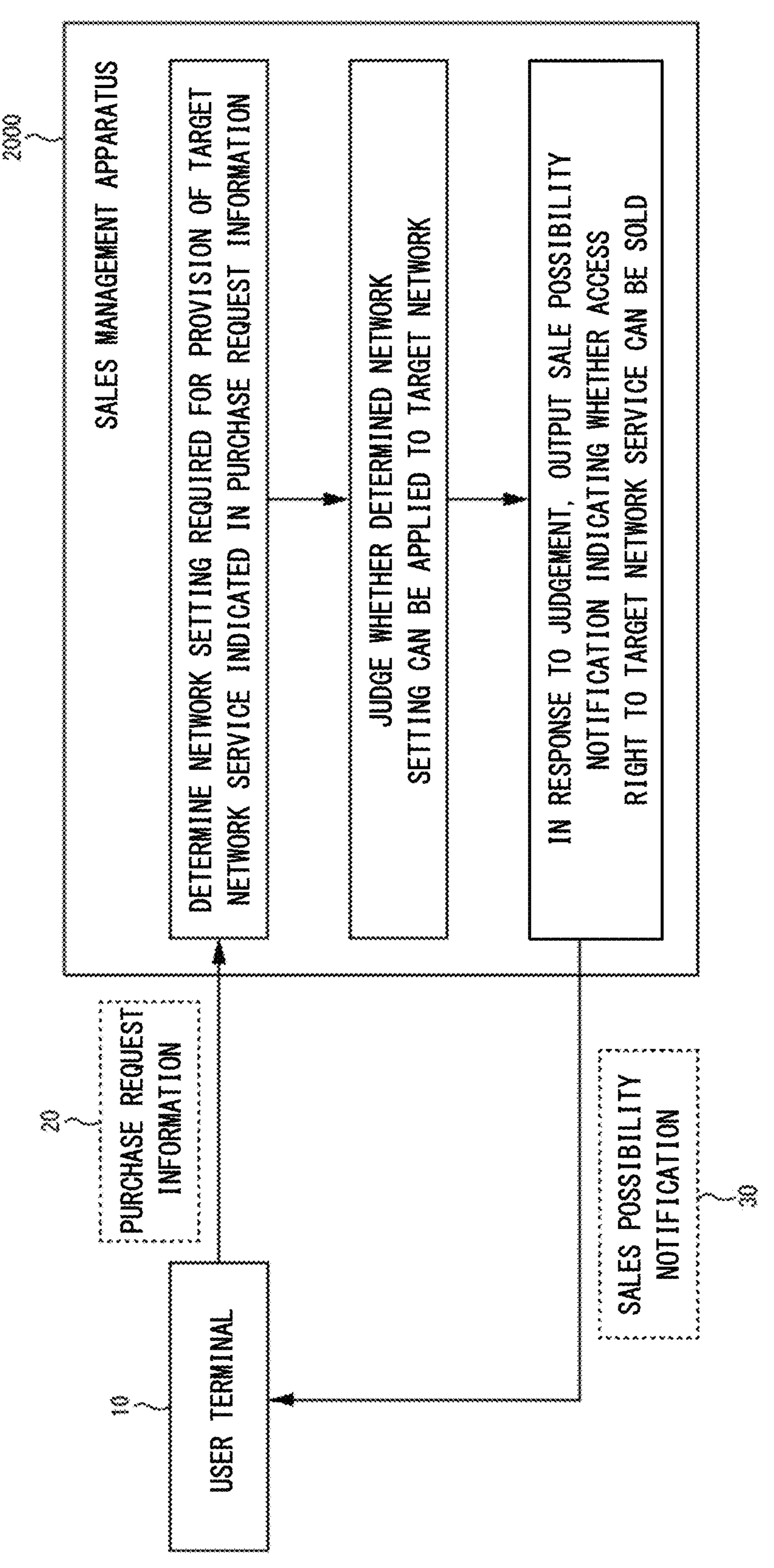
FIG. 1 is a diagram illustrating an overview of a sales management apparatus.

Hereinafter, example embodiments of the present disclosure are described in detail with reference to the drawings. In the drawings, the same or corresponding element is denoted by the same reference sign, and redundant descriptions are omitted as necessary for clarity of description. Unless otherwise stated, values that are defined in advance, such as a predefined value and a threshold value are stored in advance in a storage device or the like that can be accessed from an apparatus that uses the value. Further, unless otherwise stated, the storage unit is constituted by any number of storage devices.

Overview

FIG. 1 is a diagram illustrating an overview of a sales management apparatus 2000. Herein, FIG. 1 is a diagram for facilitating understanding of an overview of the sales management apparatus 2000, and the operation of the sales management apparatus 2000 is not limited to that illustrated in FIG. 1.

The sales management apparatus 2000 is used for selling, to a user who intends to participate in an event, an access right to a network service related to the event. The event may be any event, such as a sports match, a concert, or a play. The network service is, for example, provision of content related to an event (for example, distribution of audio and video).

Herein, the event that the user is trying to join is referred to as a "target event". The user who intends to purchase the access right of the network service related to the target event by using the sales management apparatus 2000 is referred to as a "target user". Furthermore, the computer used by the target user for using a network service is referred to as a "user terminal 10". The user terminal 10 is, for example, a wireless communication terminal such as a smartphone.

There is a plurality of network services handled by the sales management apparatus 2000. Therefore, one network service that the target user desires to purchase the access right thereto is selected from among the plurality of network services. Hereinafter, the selected network service is referred to as a "target network service". The target network service is a network service related to the target event. Note that there may be a plurality of network services related to the target event. In such a case, the target network service is one of a plurality of network services related to the target event.

The target network service is selected, for example, by using the user terminal 10. However, the computer used for utilizing the target network service and the computer used for purchasing the access right to the target network service may be different computers. Hereinafter, unless otherwise described, it is assumed that the target network service is selected by the user terminal 10.

The sales management apparatus 2000 acquires purchase request information 20 indicating information with which the target network service can be determined. The purchase request information 20 is transmitted from the user terminal 10 to the sales management apparatus 2000, for example.

Each network service related to the target event is provided to the user terminal 10 via the target network. For example, the target network is a core network (such as a 4G core network or a 5G core network) for wireless communication.

Herein, in order to provide the target network service to the target user, it is required that network settings necessary for providing the target network service can be applied to the target network. Examples of the network setting to be applied to the target network include one or more network QoS parameter settings, one or more utilization settings of the network function, or the like. The network QoS parameters include, for example, network bandwidth, throughput, latency, or the like. The network functions include, for example, as a means for providing the service to the target user with the required quality of service, a packet transferring function, a path redundancy function, and a network-QoS control function using multi-protocol label switching (MPLS). In addition, for example, the network function includes a multicast function for configuring a distribution tree whose root is the server that provides the service. The utilization settings of the network function include, for example, selection of ON and OFF of the network function, setting of a mode of the network function, and setting of other parameters related to the network function.

The sales management apparatus 2000 determines a network setting associated with the target network service. The network setting associated with the target network service is, for example, a network setting necessary for providing the target network service. The sales management apparatus 2000 judges whether the network setting associated with the target network service can be applied to the target network. In response to the judgement, the sales management apparatus 2000 outputs a notification (hereinafter, referred to as a sales possibility notification 30) indicating whether the access right to the target network service can be sold. The sales possibility notification 30 is transmitted to, for example, an apparatus (such as the user terminal 10) that has provided the purchase request information 20 to the sales management apparatus 2000. When it is judged that the network setting associated with the target network service is applicable to the target network, for example, the sales possibility notification 30 indicates that the access right to the target network service can be sold. Meanwhile, when it is judged that the network setting associated with the target network service is not applicable to the target network, for example, the sales possibility notification 30 indicates that the access right to the target network service cannot be sold.

<Example of Advantageous Effects>

As a method for judging whether an access right to a service can be sold, there is a method in which the total number of access rights that can be sold is defined in advance, and whether the number of access rights that have already been sold reaches the total number is judged. For example, in a sports game, the total number of tickets is defined in advance based on the number of persons that can be accommodated in the venue.

However, in a case of a network service provided via a network, the number of users who can use the network service may dynamically change according to a change in the state of the network (for example, a change in free capacity of a resource, or the like). Therefore, in a method for judging the total number of access rights that can be sold in advance, it is necessary to set the number of access rights that can be sold to a small number in order to stably provide the service. As a result, the utilization efficiency of the network is reduced.

In this regard, in the sales management apparatus 2000 according to the present example embodiment, a necessary network setting is determined for the target network service for which the target user desires to purchase the access right, and whether the network setting is applicable to the target network is judged. When the network setting can be applied to the target network, a notification indicating that the access right to the target network service can be sold is output. As described above, in the sales management apparatus 2000 according to the present example embodiment, by judging whether the network setting associated with the target network service can be applied to the target network, whether the access right to the target network service can be sold is dynamically judged. Therefore, it is not necessary to defined the total number of sellable access rights in advance, and it is possible to improve the utilization efficiency of the network.

Hereinafter, the sales management apparatus 2000 according to the present example embodiment is described in more detail.

<Example of Functional Configuration>

Figure 2:
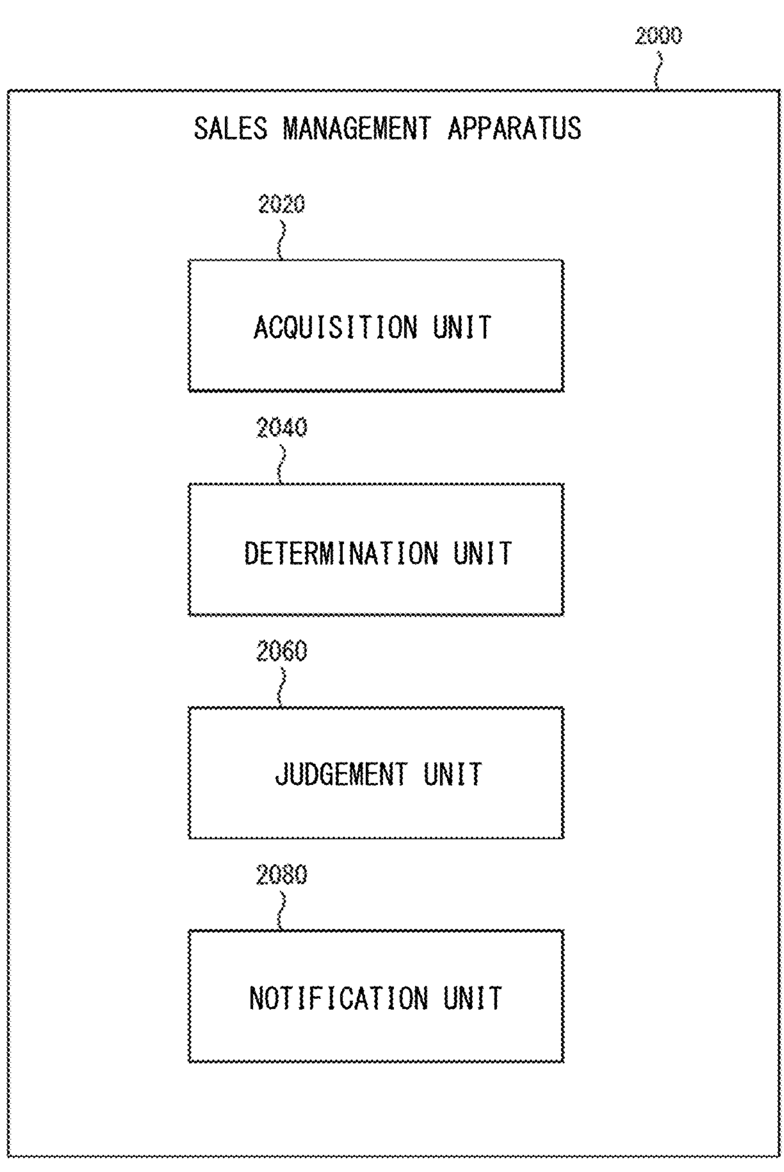
FIG. 2 is a block diagram illustrating a functional configuration of the sales management apparatus.

FIG. 2 is a block diagram illustrating a functional configuration of the sales management apparatus 2000 according to the present example embodiment. The sales management apparatus 2000 includes an acquisition unit 2020, a determination unit 2040, a judgement unit 2060, and a notification unit 2080. The acquisition unit 2020 acquires the purchase request information 20. The determination unit 2040 determines a network setting associated with the target network service being indicated in the purchase request information 20. The judgement unit 2060 judges whether the network setting associated with the target network service is applicable to the target network. In response to the judgement, the notification unit 2080 outputs the sales possibility notification 30 indicating whether the access right to the target network service can be sold.

<Example of Hardware Configuration>

Each functional component of the sales management apparatus 2000 may be achieved by hardware (for example, a hardwired electronic circuit or the like) for achieving each functional component, or may be achieved by a combination of hardware and software (for example, a combination of an electronic circuit and a program for controlling the electronic circuit, or the like). Hereinafter, a case where each functional component of the sales management apparatus 2000 is achieved by a combination of hardware and software is further described.

Figure 3:
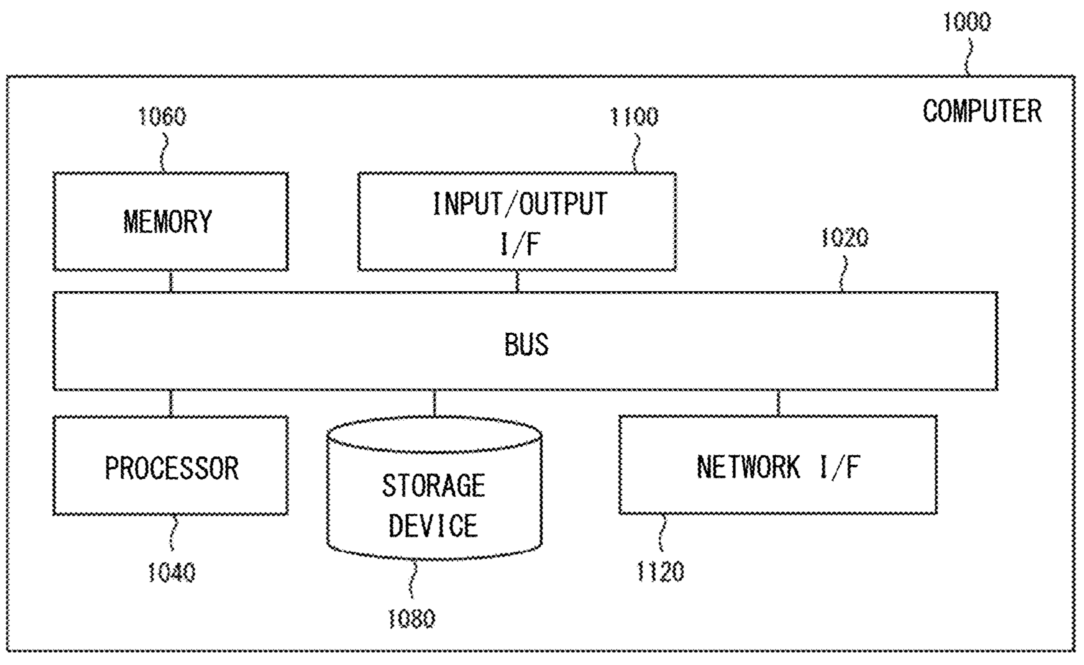
FIG. 3 is a block diagram illustrating a hardware configuration of a computer with which the sales management apparatus can be achieved.

FIG. 3 is a block diagram illustrating a hardware configuration of a computer 1000 with which the sales management apparatus 2000 can be achieved. The computer 1000 is any computer. For example, the computer 1000 is a stationary computer such as a personal computer (PC) or a server machine. In addition, for example, the computer 1000 is a portable computer such as a smartphone or a tablet terminal. The computer 1000 may be a dedicated computer designed to achieve the sales management apparatus 2000, or may be a general-purpose computer.

For example, by installing a predetermined application on the computer 1000, each function of the sales management apparatus 2000 is achieved by the computer 1000. The application is configured by a program for implementing each functional component of the sales management apparatus 2000. A method for acquiring such program may be any method. For example, the program can be acquired from a storage medium (such as a DVD disk or a USB memory) in which the program is stored. In addition, for example, the program can be acquired by downloading the program from a server device that manages a storage device in which the program is stored.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit and receive data to and from one another. However, the method for connecting the processors 1040 and the like to one another is not limited to bus connection.

The processor 1040 is a processor such as a central processing unit (CPU), a graphics processing unit (GPU), or a field-programmable gate array (FPGA). The memory 1060 is a primary storage device realized by using a random access memory (RAM) or the like. The storage device 1080 is a secondary storage device realized by using a hard disk, a solid state drive (SSD), a memory card, a read-only memory (ROM), or the like.

The input/output interface 1100 is an interface for connecting the computer 1000 and an input/output device. For example, an input device such as a keyboard or an output device such as a display device is connected to the input/output interface 1100.

The network interface 1120 is an interface for connecting the computer 1000 to a network. The network may be a local area network (LAN) or a wide area network (WAN).

The storage device 1080 stores a program (a program for implementing the above-described application) for realizing each functional component of the sales management apparatus 2000. The processor 1040 loads the program into the memory 1060 and executes the program, and thereby realizing each of the functional components of the sales management apparatus 2000.

The sales management apparatus 2000 may be realized by a single computer 1000 or may be realized by a plurality of computers 1000. In the latter case, the configuration of each computer 1000 need not be the same, but may be different from each other. Further, each function of the sales management apparatus 2000 may be realized by a sales management system configured of the plurality of computers 1000 by causing different computers 1000 to have each of the functional components of the sales management apparatus 2000. However, in such a case, two or more functional components of the sales management apparatus 2000 may be provided in one computer 1000. For example, a sales management system may be realized by two computers 1000, being a computer 1000 having an acquisition unit 2020 and a determination unit 2040, and a computer 1000 having a judgement unit 2060 and a notification unit 2080.

<Processing Flow>

Figure 4:
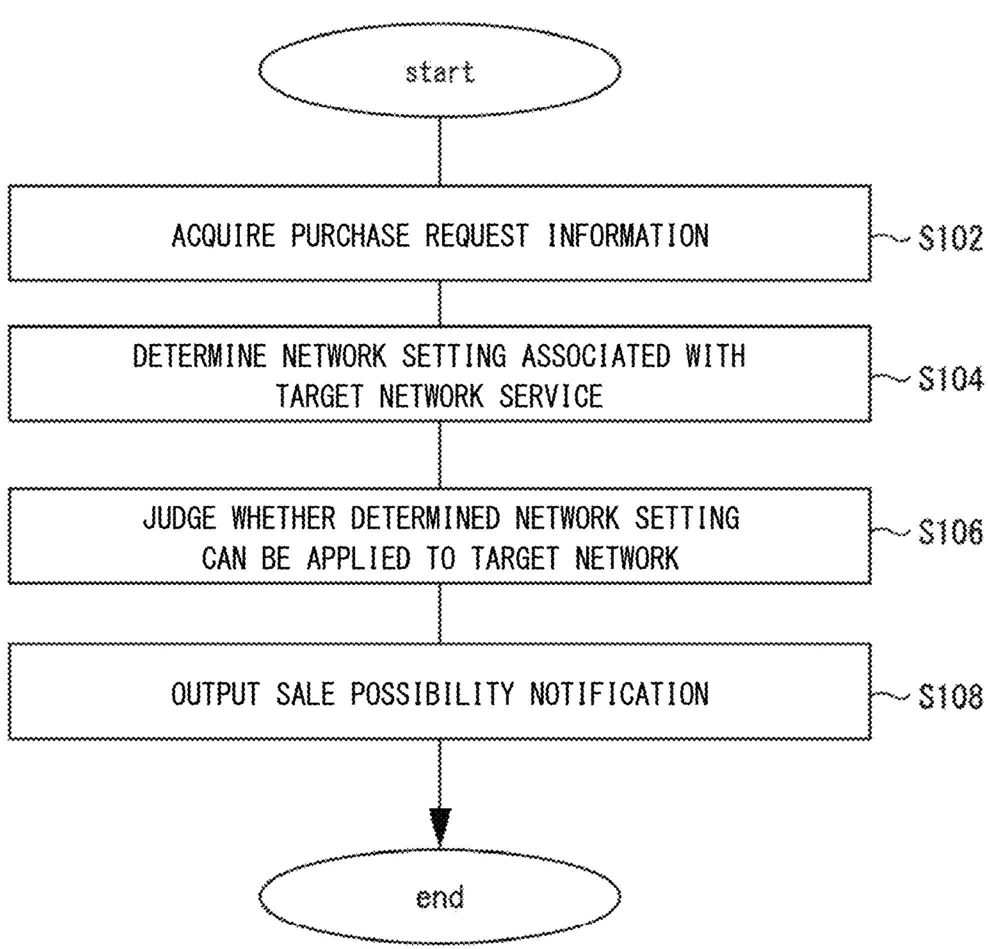
FIG. 4 is a flowchart illustrating a flow of processing executed by the sales management apparatus.

FIG. 4 is a flowchart illustrating a flow of processing executed by the sales management apparatus 2000 according to the present example embodiment. The acquisition unit 2020 acquires the purchase request information 20 (S102). The determination unit 2040 determines the network setting associated with the target network service with respect to the target network service indicated in the purchase request information 20 (S104). The judgement unit 2060 judges whether the network setting associated with the target network service can be applied to the target network (S106). In response to the judgement in S106, the notification unit 2080 outputs the sales possibility notification 30 (S108).

<Acquisition of Purchase Request Information 20: S102>

The acquisition unit 2020 acquires the purchase request information 20 (S102). The acquisition unit 2020 acquires the purchase request information 20 in various ways. For example, the acquisition unit 2020 provides the user terminal 10 with a selection screen on which one of a plurality of network services related to the target event can be selected, and acquires, from the user terminal 10, purchase request information 20 indicating the content of the input performed on the selection screen. For example, the selection screen is a screen represented by a web page including an input interface such as a check box or a radio button.

Figure 5:
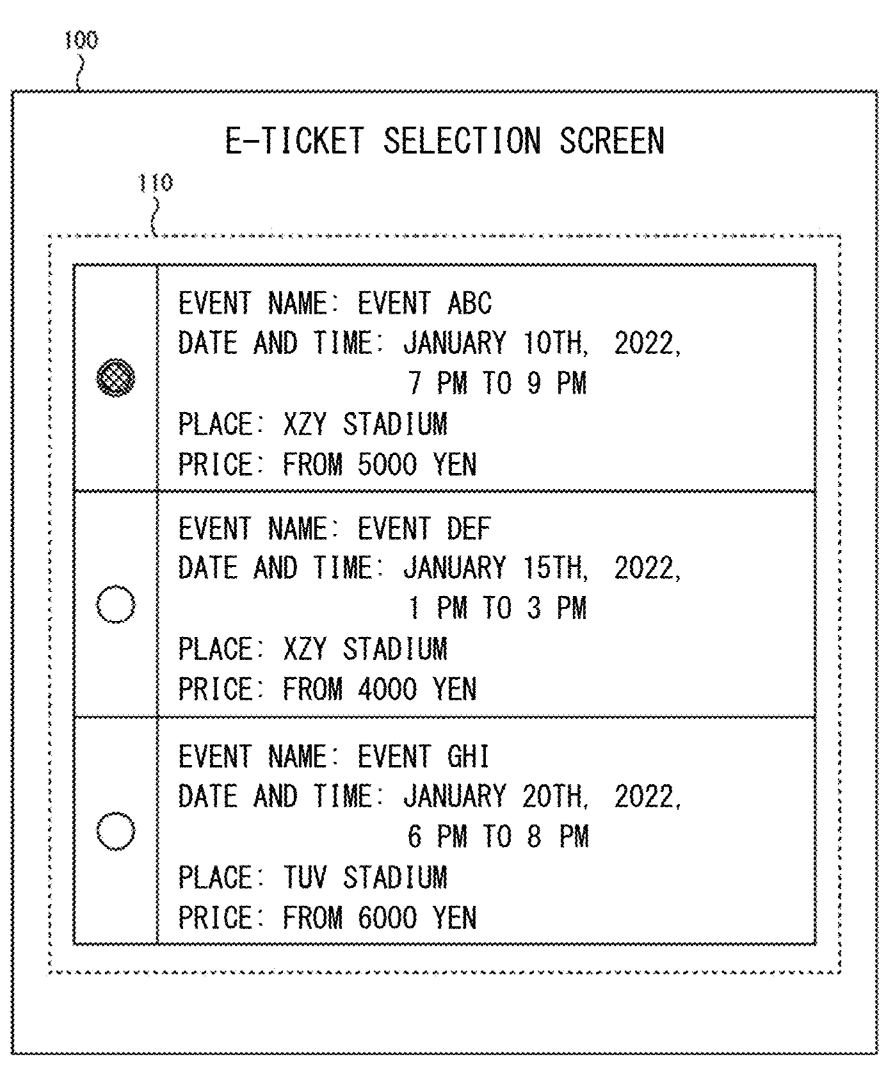
FIG. 5 is a diagram illustrating a selection screen provided to a target user.

FIG. 5 is a diagram illustrating a selection screen provided to a target user. The selection screen 100 of FIG. 5 includes a selection area 110 for selecting a network service. In this example, three events are selectable: event ABC, event DEF, and event GHI. The target user selects one of the three events in the selection area 110. As a result, the network service related to the selected event is selected as the target network service.

For example, when a target user wants to use a network service related to a target event, the target user accesses a web site provided by the sales management apparatus 2000 in order to purchase an access right to the network service. Access to the web site may be made via a general-purpose web browser or via a dedicated application for using the web site.

The target user selects the target event to join on the web site. As a result, a web page (for example, selection screen 100 of FIG. 5) is provided to the target user to purchase the access right to the network service related to the selected target event.

<Determination of Network Setting: S104>

The determination unit 2040 determines a network setting associated with the target network service (S104). The network setting is defined by, for example, one or more QoS parameters or parameters representing the configuration of one or more network functions. The parameter indicating the setting of the network function is, for example, a parameter indicating ON or OFF of the network function, a parameter indicating a mode of the network function, or a parameter indicating another setting value.

The network setting is defined in association with the target network, for example. In such a case, the setting information in which the network service and the network setting are associated with each other is stored in a storage unit accessible from the sales management apparatus 2000 in advance. The determination unit 2040 determines the network setting associated with the target network service by acquiring the network setting associated with the target network service from the setting information stored in the storage unit.

FIG. 6 is a diagram illustrating network settings defined for each network service. In the table 200 of FIG. 6, the service identification information 202 and the network setting 204 are associated with each other. The service identification information 202 indicates identification information of a network service. The network setting 204 indicates a network setting associated with the network service identified by the service identification information 202. The parameter P1 or the like shown in the network setting 204 represents, for example, the name of a parameter representing a setting of a QoS parameter or a network function. A value x11 or the like indicated in the network setting 204 is the value of an associated parameter. For example, when P1 is a parameter named network bandwidth, the values x11 and x12 that is are set for P1 are values representing the size of the network bandwidth.

Herein, when using a network service, one of a plurality of service levels may be selected. The service level represents a degree of fullness of the network service provided in the event. For example, the service level is represented by a quality level of data (image quality and sound quality) provided through a network service, a size of an available communication bandwidth, and the like. In addition, for example, the service level is represented by whether the broadband in the event area provided in the event venue is available, the degree of fullness of an available content (for example, whether the special content is available), and the like.

When a plurality of service levels is set for one network service in such a way, the network settings are defined in association with the combination of the network service and the service level. Therefore, the purchase request information 20 further includes information with which a service level desired by the target user can be determined in addition to information with which the target network service can be determined. Hereinafter, a service level desired by a target user is referred to as a target service level.

In order to make the target service level to be indicated by the purchase request information 20 in such a way, for example, the service level can be further selected in addition to the network service on the selection screen 100 described above. In addition, for example, after the network service is selected on the selection screen 100, a screen in which the service level can be selected may be further provided.

Figure 7:
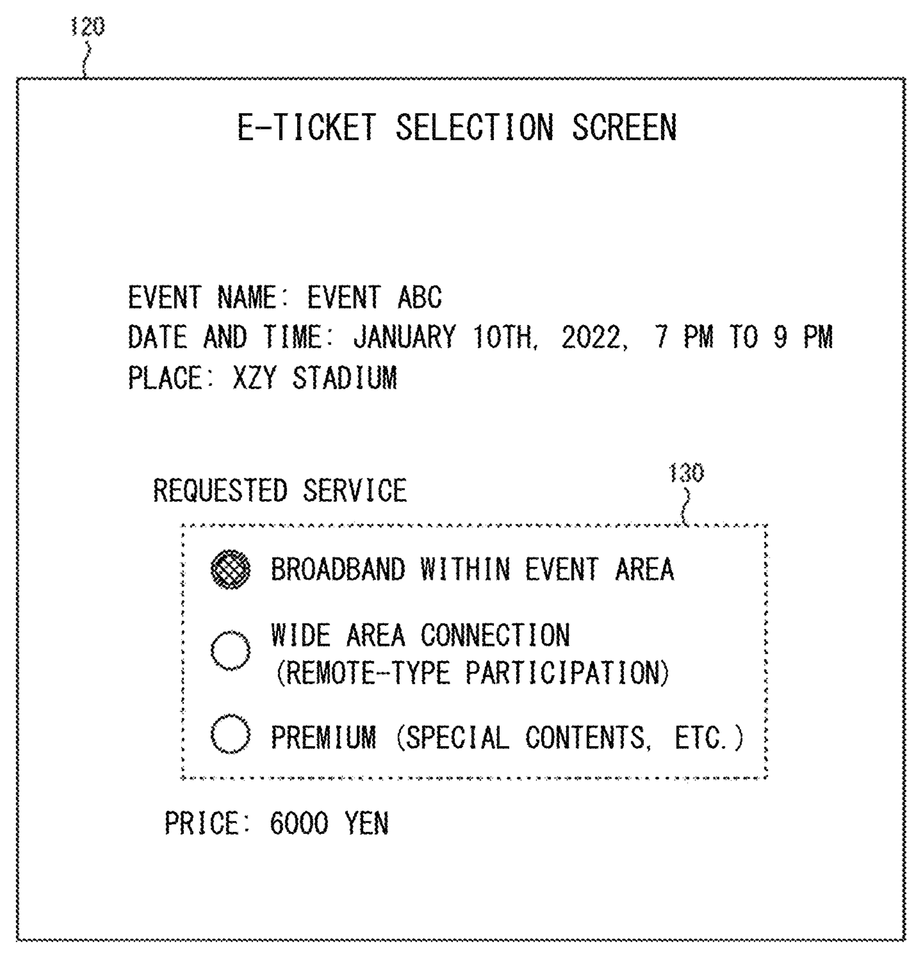
FIG. 7 is a diagram illustrating a screen on which a service level is to be selected.

FIG. 7 is a diagram illustrating a screen in which a service level is to be selected. In the example of FIG. 7, three service levels are provided in the network service related to the event ABC. Therefore, one of the three service levels can be selected in the selection area 130 of the selection screen 120. If “broadband within event area” is selected, a broadband connection environment provided at the event location can be used. If “wide area connection” is selected, the event is participated remotely via a wide area connection environment. If “premium” is selected, provision of special contents can be received.

The determination unit 2040 determines the target network service and the target service level by using the purchase request information 20. Then, the determination unit 2040 determines the network setting by using the determined pair of the target network service and the target service level. Specifically, in the above-described setting information, the network setting is indicated in association with the network service and the service level. Therefore, the determination unit 2040 determines the network setting by acquiring the network setting associated with the target network service and the target service level from the setting information.

In the following description, unless otherwise described, it is assumed that the network setting is defined in association with the network service. When the network setting is defined in association with the network service and the service level, the “network setting associated with the target network service” in each of the following descriptions can be rephrased by the “network setting associated with the target network service and the target service level”.

<Judgement of Whether the Network Setting can be Applied: S106>

The judgement unit 2060 judges whether the network setting associated with the target network service can be applied to the target network (S106). This judgement is performed, for example, by using information on network resources available in the target network (hereinafter, resource information). The resource information indicates the total amount of network resources that the target network has, the amount of network resources currently available in the target network (that is, the amount of free resources), the type of network functions that can be provided in the target network, and the like.

There are various methods for judging whether the network setting associated with the target network service can be applied to the target network. For example, it is assumed that network slicing is performed in the target network. In such a case, the target network service can be provided to the target user by assigning a network slice to which the network setting associated with the target network service is applied to the target user. Therefore, the judgement unit 2060 judges whether the network setting associated with the target network can be applied to the target network by judging whether the network slice to which the network setting associated with the target network is applied can be assigned to the target user. That is, when the network slice to which the network setting associated with the target network is applied can be assigned to the target user, it is judged that the network setting associated with the target network can be applied to the target network. Meanwhile, when the network slice to which the network setting associated with the target network is applied cannot be assigned to the target user, it is judged that the network setting associated with the target network cannot be applied to the target network.

In order to avoid congestion with other general user traffic, it is preferable that the network slice used for providing the target network service is a closed network dedicated to providing the network service.

Herein, when a network slice is shared by a plurality of users, there is a possibility that a network slice for providing a target network service is already present in the target network. Therefore, first, the judgement unit 2060 judges whether a network slice for providing the target network service exists in the target network. Herein, the information about the network slice currently provided in the target network is included in the resource information described above, for example.

When a network slice for providing the target network service already exists in the target network, the judgement unit 2060 further judges whether there is a network slice that can be assigned to the target user in the already existing network slice. Note that assigning a network slice to a user can also be expressed as “accommodating a user in a network slice”. Herein, an existing technique (for example, a method using a trained machine learning model) can be used as a technique for judging whether a specific network slice can be assigned to a specific user.

When there is a network slice that can be assigned to the target user among the existing network slices, the judgement unit 2060 judges that the network setting associated with the target network service is applicable to the target network.

When the network slice for providing the target network service does not exist in the target network or the existing network slice cannot be assigned to the target user, the judgement unit 2060 judges whether the network slice to which the network setting associated with the target network service is applied can be generated in the target network by using the resource information. Herein, an existing method can be used for judging whether a network slice to which a specific network setting is applied can be generated in a specific network. For example, a method utilizing a trained machine learning model may be used for the judgement.

When the network slice to which the network setting associated with the target network service is applied can be generated in the target network, the judgement unit 2060 judges that the network setting associated with the target network service can be applied to the target network. Meanwhile, when the network slice to which the network setting associated with the target network service is applied cannot be generated in the target network, the judgement unit 2060 judges that the network setting associated with the target network service cannot be applied to the target network.

Herein, the process of assigning the network slice to the target user may be performed at a time point when it is judged that there is a network slice that can be assigned to the target user, or may be performed in response to the access right to the target network service being purchased by the target user. In the latter case, for example, the judgement unit 2060 stores the identification information of the network slice that can be assigned to the target user in a storage unit. Then, when the access right to the target network service is purchased by the target user, the sales management apparatus 2000 associates the identification information of the network slice stored in the storage unit with the access right purchased by the target user. Herein, the functional component of the sales management apparatus 2000 that associates the identification information of the network slice with the access right is referred to as an association unit. Note that, as described later, the information about the access right purchased by the target user is added to, for example, the account information of the target user.

Note that a network slice may not necessarily be used for providing the target network service. When the network slice is not used, the judgement unit 2060 judges whether the network setting associated with the target network service can be applied to the target network by using the resource information about the target network. Herein, an existing technique can be used as a technique for judging whether a specific network setting can be applied to a network, based on information about a resource or a function of the network.

<<About Resource Information>>

The information about the network resource of the target network can be grasped by continuously monitoring the state of the target network. Hereinafter, an apparatus that generates resource information by monitoring the state of the target network is referred to as a network monitoring apparatus. Various existing methods can be used for a specific method in which the state of a specific network is continuously monitored to grasp the state of the network.

The resource information is provided, for example, from the network monitoring apparatus to the sales management apparatus 2000. For example, the determination unit 2040 acquires the resource information by requesting the network monitoring apparatus to provide the resource information. In addition, for example, the resource information may be periodically transmitted from the resource monitoring apparatus to the sales management apparatus 2000.

<<Use of Information Relating to Event>>

Information relating to the target event may be further used for judging whether the network setting associated with the target network service is applicable to the target network. As the information relating to the target event, for example, an event venue, a planned number of customers, or the like can be used. The event venue is used, for example, to determine a base station (for example, a 5G small cell area) connected from a mobile terminal located at or around the event venue. In such a case, for example, a core network that accommodates the area of the determined base station is used as the target network. As a result, it is possible to use ad hoc network resources in such a way that the network resources of the core network are temporarily used for providing the network service, and the network resources are immediately released after the end of the event.

The planned number of customers of events is used for ensuring network resources in such a way that the event provider can provide network services to the planned number of participants. For example, as described above, it is assumed that a plurality of service levels is provided in a network service related to an event. In such a case, if the number of users who select a high service level is large, there is a possibility that the network resource becomes insufficient before the number of purchasers of the access right to the network service related to the event reaches the planned number of customers, and thus the access right cannot be sold. Therefore, it is preferable that the judgement unit 2060 judges whether a network setting for the target network is available, taking into consideration the planned number of customers of the event.

For example, before the selling of the access right is started, the event provider notifies, as a service request, to the telecommunications carrier that manages the network, how large the event size is assumed to be (for example, how many customers are planned to be accommodated for each service level). First, it is judged whether a network resource of the scale of the service request can be ensured. Then, when the number of purchasers of the access right varies among the service levels after the sales of the access right is started, the network resources are reallocated in such a way that more network resources are allocated to the network slice that provides the network service at the service level at which the purchaser is increasing.

<Delegation of Judgement>

The judgement unit 2060 may delegate processing of judging whether the network setting associated with the target network service is applicable to the target network to an apparatus (hereinafter, referred to as a network management apparatus) that manages the target network. In such a case, for example, the judgement unit 2060 transmits, to the network management apparatus, a request including information indicating a network setting associated with the target network service. In response to receiving the request, the network management apparatus acquires the resource information. Then, the network management apparatus uses the resource information to judge whether the network setting indicated in the request is applicable to the target network. When it is necessary to generate a new network slice to be assigned to the target user, it is preferable that the network management apparatus performs processing of generating a network slice to be used for providing the target network service in the target network in response to judging that the network setting associated with the target network service is applicable to the target network.

The network management apparatus transmits a response indicating the result of the judgement to the sales management apparatus 2000. The judgement unit 2060 receives the response and uses the judgement result indicated in the response as it is. That is, when the response from the network management apparatus indicates that "the network setting associated with the target network service is applicable to the target network", the judgement unit 2060 judges that the network setting associated with the target network service is applicable to the target network. Meanwhile, when the response from the network management apparatus indicates that "the network setting associated with the target network service cannot be applied to the target network", the judgement unit 2060 judges that the network setting associated with the target network service cannot be applied to the target network. Note that, when the response indicates that "the network setting associated with the target network service is applicable to the target network" and also network slicing is used, it is preferable that the response includes identification information of a network slice that can be assigned to the target user.

<Output of Sales Possibility Notification: S108>

When it is judged that the network setting associated with the target network service is applicable to the target network, the notification unit 2080 outputs the sales possibility notification 30 (S108). A sales permission notification is transmitted to a computer (for example, the user terminal 10) used for access to the sales management apparatus 2000.

For example, the sales permission notification includes a purchase screen on which processing of purchasing an access right to the target network service can be performed. In this purchase screen, the access right can be purchased by performing an input operation (for example, designation of a payment method or the like) for purchasing the access right.

When the access right to the target network is purchased, the access right and the target user is associated to each other. For example, it is assumed that information relating to the target user is managed as account information of the target user. In such a case, information about the purchased access right (identification information of the access right, contents of the access right, and the like) is added to the account information of the target user. As a method for managing the account information of the user, various existing methods can be used.

Herein, it is assumed that it is judged that the network setting associated with the target network service cannot be applied to the target network. In such a case, for example, the notification unit 2080 outputs a notification (hereinafter, a sales refusal notification) indicating that the access right to the target network service cannot be sold.

The sales refusal notification includes, for example, a selection screen for selecting another type of network service. When the network service is selected on the selection screen, the sales management apparatus 2000 handles the selected network service as the target network service and performs the same processing again.

<Example of Use Environment of Sales Management Apparatus 2000>

In order to facilitate understanding of the usefulness of the sales in management apparatus 2000, a usage environment of the sales management apparatus 2000 is exemplified. The usage environment described here is an example, and the usage environment of the sales management apparatus 2000 is not limited to the example described below.

Figure 8:
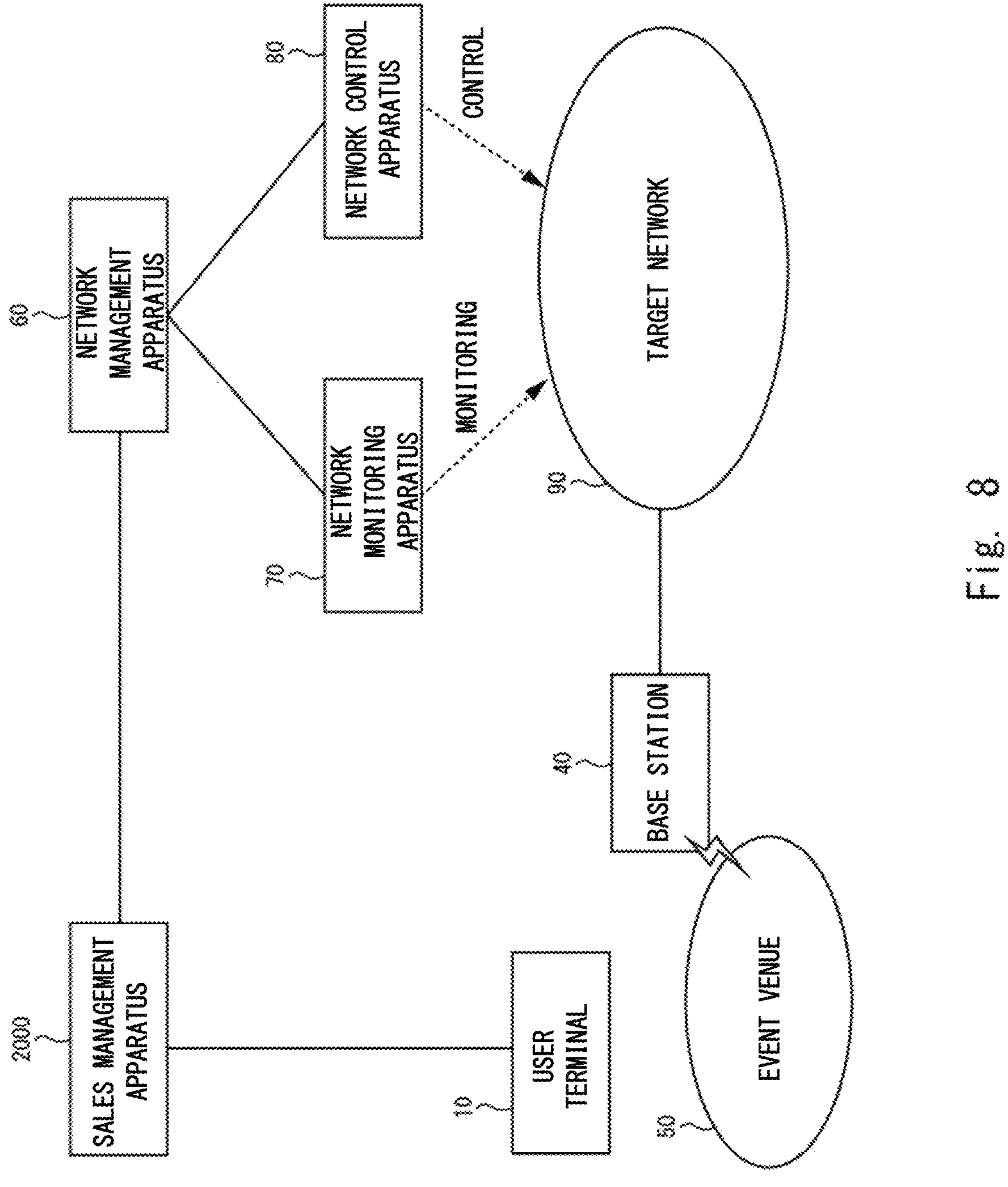
FIG. 8 is a diagram illustrating the sales management apparatus together with a usage environment thereof.

FIG. 8 is a diagram illustrating the sales management apparatus 2000 together with its usage environment. A target network 90 is a wireless communication core network. A base station 40 is a wireless communication base station connected to the target network 90, and is provided near an event venue 50 which is the venue of the target event. Therefore, a mobile terminal being used in the event venue 50 is connected to the target network 90 via the base station 40.

A network management apparatus 60 manages the target network 90 by using a network monitoring apparatus 70 and a network control apparatus 80. The network monitoring apparatus 70 is an apparatus that monitors the state of the target network 90. The network control apparatus 80 is an apparatus that performs various settings for the target network 90. In the present usage environment, a network slice is used for providing a target network service. Therefore, the network control apparatus 80 generates a network slice in the target network 90 in response to an instruction from the network management apparatus 60. Also, assignment of a user to the network slice and the like are performed by the network control apparatus 80.

In the present usage environment, a target user accesses the sales management apparatus 2000 by using the user terminal 10. For example, the sales management apparatus 2000 is managed by an event provider that provides an event, and provides a portal site in which various information related to the event are available. The target user uses the portal site to purchase an e-ticket for access to a desired target network service. Herein, the e-ticket is data representing an access right to a specific network service.

Herein, the sales management apparatus 2000 is managed by the event provider, while the network management apparatus 60 is managed by a network provider. In the present usage environment, the sales management apparatus 2000 managed by the event provider and the network management apparatus 60 managed by the network provider operate in cooperation with each other.

In a case where such a cooperative operation cannot be performed, it is necessary to perform a consultation or a contract in advance between the event provider and the network provider before starting sales of the e-ticket, and to ensure in advance the network resources to be used for providing the network service related to the event. Therefore, it takes time from the event announcement to the use of the network service.

Meanwhile, in the present usage environment, since the sales management apparatus 2000 and the network management apparatus 60 operate in cooperation with each other, it is possible to judge whether to provide an e-ticket to the user on demand in consideration of the state of the target network 90. Therefore, the network service can be used immediately after the event announcement. As a result, it is possible to achieve an increase in the number of users due to an increase in convenience of the event and an increase in efficiency of event management.

Figure 9:
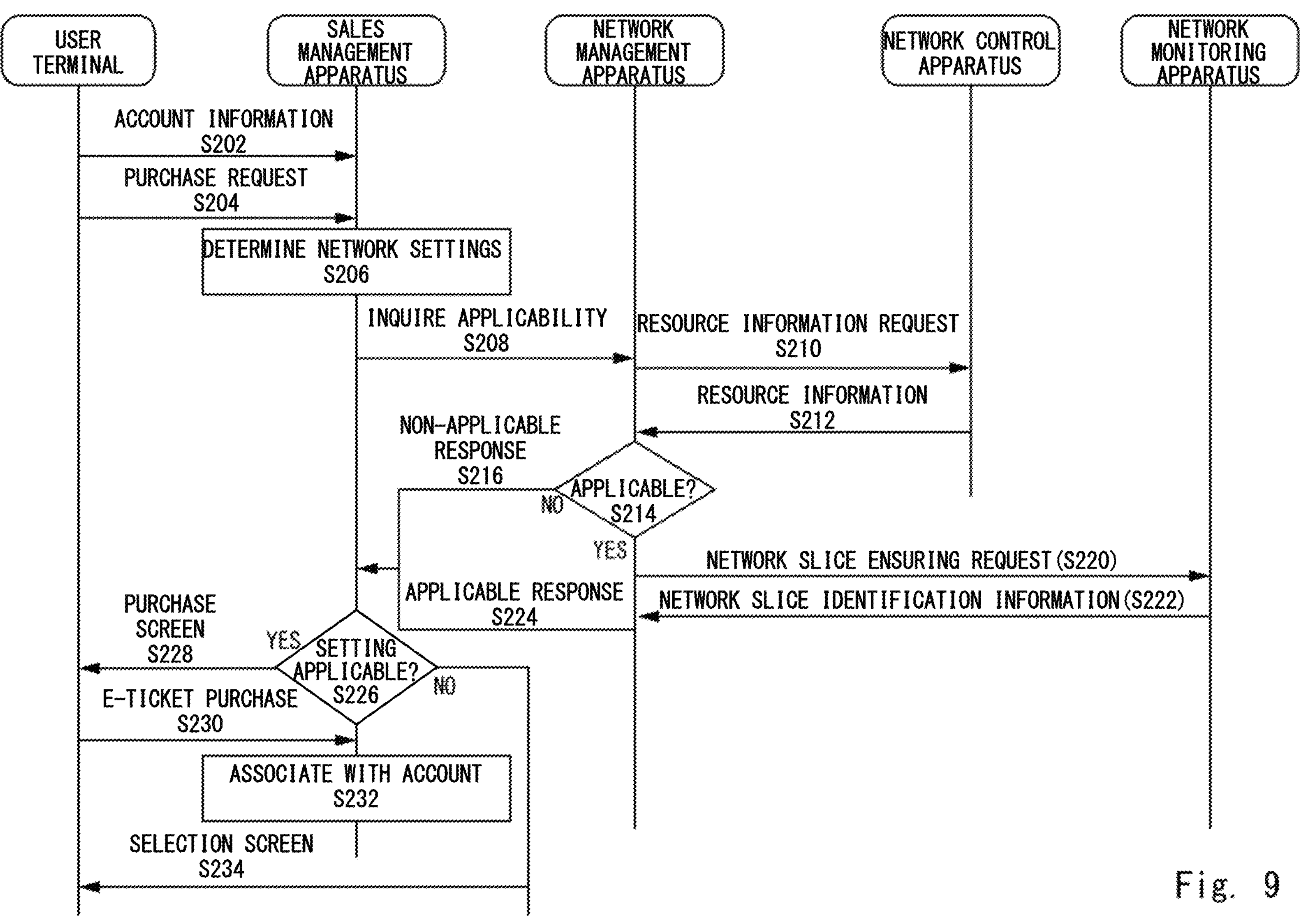
FIG. 9 is a diagram illustrating a flow of purchasing an e-ticket using the sales management apparatus.

Hereinafter, a flow of purchasing an e-ticket by using the sales management apparatus 2000 is described. FIG. 9 is a diagram illustrating a flow of purchasing an e-ticket by using the sales management apparatus 2000. First, when the target user performs a login operation at the portal site, account information (user ID, password, and the like) of the target user is transmitted from the user terminal 10 to the sales management apparatus 2000 (S202). Thereafter, the target user selects the target network service on the selection screen 100, and a purchase request including the purchase request information 20 is transmitted from the user terminal 10 to the sales management apparatus 2000 (S204).

The sales management apparatus 2000 determines a network setting associated with the target network service indicated in the purchase request information 20 (S206). The sales management apparatus 2000 transmits, to the network management apparatus 60, a request to inquire whether the network setting associated with the target network service is applicable to the target network 90 (S208). In response to receiving the request from the sales management apparatus 2000, the network management apparatus 60 requests the network monitoring apparatus 70 for resource information (S210), and acquires the resource information (S212).

The network management apparatus 60 judges whether the network setting associated with the target network service can be applied to the target network 90 by using the request from the sales management apparatus 2000 and the resource information (S214). When the network setting associated with the target network service cannot be applied to the target network 90 (S214: NO), the network management apparatus 60 transmits a response indicating that the network setting is not applicable to the sales management apparatus 2000 (S216).

When the network setting associated with the target network service is applicable to the target network 90 (S214: YES), the network management apparatus 60 instructs the network control apparatus 80 to ensure a network slice to be assigned to the target user (S220). The network control apparatus 80 transmits the identification information of the network slice ensured for the target user to the network management apparatus 60 (S222). The network management apparatus 60 transmits, to the sales management apparatus 2000, a response indicating that the network setting associated with the target network service is applicable to the target network 90 (S224).

The response of S224 preferably includes identification information of the ensured network slice. Herein, when a network slice to be used for providing a target network service already exists and the target user can be assigned the network slice, identification information of such network slice is transmitted to the network management apparatus 60. Meanwhile, when there is no network slice to be used for providing the target network service, or when a network slice that already exists cannot be assigned to the target user, a new network slice to which the network setting associated with the target network service is applied is generated, and identification information of such network slice is transmitted to the network management apparatus 60.

The sales management apparatus 2000 judges whether the response from the network management apparatus 60 indicates applicable or non-applicable (S226). When the response from the network management apparatus 60 indicates applicable (S226: YES), the sales management apparatus 2000 transmits a purchase screen indicating the sales possibility notification 30 to the user terminal 10 (S228). The purchase screen indicates that access rights can be sold. Then, the target user operates the purchase screen to purchase an e-ticket of the target network service (S230). The sales management apparatus 2000 associates the information of the purchased e-ticket with the account of the target user (S232). In other words, the information of the e-ticket is stored in the account information of the target user. Herein, the identification information of the network slice ensured for the target user is also stored in the account information in association with the e-ticket. Note that various existing methods can be used as a method for implementing payment at a web site.

In S226, when the response from the network management apparatus 60 indicates non-applicable (S226: NO), the sales management apparatus 2000 transmits a selection screen representing the sales possibility notification 30 to the user terminal 10 (S234). On the selection screen, a message indicating that the e-ticket cannot be sold for the network service selected in S204 is displayed. Further, in this selection screen, the network service selected in S204 cannot be selected. Accordingly, it is possible to prompt the target user to select another network service.

When using the network service related to the purchased e-ticket, the user accesses an authentication server to perform user authentication. The authentication server may be realized by the sales management apparatus 2000 or may be realized by an apparatus other than the sales management apparatus 2000. The authentication server that has received correct authentication information instructs the network management apparatus 60 to allocate a network slice to the authenticated user. For example, the authentication server transmits the identification information of the network slice associated with the account information of the authenticated user to the network management apparatus 60. The network management apparatus 60 transmits an instruction to the network control apparatus 80 to assign the network slice determined by the identification information to the authenticated user. The network control apparatus 80 allocates a network slice to the user, based on the instruction. In other words, the setting of the target network 90 is changed in such a way that the authenticated user can access the network slice associated with the account of the user.

Herein, in order to implement the provision of the content included in the network service according to the e-ticket (for example, the distribution of audio and video, and the like), the content provided from the content providing server needs to be provided to the user terminal of each user who uses the network service via the associated network slice. As a specific method for providing content to a user connected to a specific network slice, various existing methods can be used. For example, route information is set in such a way that flow identification is performed on the output from the content providing server and the destination is forwarded to the target network slice in units of flows. In addition, in the network slice, a necessary network function can be operated in such a way that a multicast tree can be constructed and content can be stably distributed to connected users.

Although the present invention has been described with reference to the example embodiments, the present invention is not limited to the above-described example embodiments. Various modifications that can be understood by a person skilled in the art within the scope of the present invention can be made to the configuration and details of the present invention.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Some or all of the above-described example embodiments may be described as the following supplementary notes, but are not limited thereto.

(Supplementary Note 1)

A sales management apparatus comprising:

determination means for determining a network setting of a target network service, which is a network service selected by a target user, from among a plurality of network services related to an event;

judgement means for judging whether the determined network setting is applicable to a target network; and notification means for outputting, in response to the judgement, a sales possibility notification indicating whether an access right to the target network service can be sold.

(Supplementary Note 2)

The sales management apparatus according to supplementary note 1, wherein, when a network slice to which the determined network setting is applied can be assigned to the target user, the judgement means judges that the determined network setting is applicable to the target network.

(Supplementary Note 3)

The sales management apparatus according to supplementary note 2, further comprising association means for associating, in response to the target user purchasing an access right to the target network service, the access right purchased by the user with a network slice assigned to the target user.

(Supplementary Note 4)

The sales management apparatus according to supplementary note 1, wherein the determination means determines a network setting of the target network service according to information associating the network service with a network setting of the network service.

(Supplementary Note 5)

The sales management apparatus according to supplementary note 1, wherein the determination means determines, as a network setting of the target network service, the network setting that is associated with the target network service and the service level selected by the target user in information associating a network setting with the network service and the service level.

(Supplementary Note 6)

The sales management apparatus according to any one of supplementary notes 1 to 5, wherein the judgement means handles, as the target network, a core network accommodating a base station associated with a venue of an event related to the target network service.

(Supplementary Note 7)

The sales management apparatus according to any one of supplementary notes 1 to 6, wherein the judgement means judges whether the determined network setting is applicable to the target network, according to a planned number of customers of an event related to the target network service.

(Supplementary Note 8)

A sales management method being executed by a computer, comprising:

a determination step of determining a network setting of a target network service, which is a network service selected by a target user, from among a plurality of network services related to an event;

a judgement step of judging whether the determined network setting is applicable to a target network; and a notification step of outputting, in response to the judgement, a sales possibility notification indicating whether an access right to the target network service can be sold.

(Supplementary Note 9)

The sales management method according to supplementary note 8, wherein in the judgement step, when a network slice to which the determined network setting is applied can be assigned to the target user, judging that the determined network setting is applicable to the target network.

(Supplementary Note 10)

The sales management method according to supplementary note 9, further comprising an association step of associating, in response to the target user purchasing an access right to the target network service, the access right purchased by the user with a network slice assigned to the target user.

(Supplementary Note 11)

The sales management method according to supplementary note 8, wherein in the determination step, determining a network setting of the target network service according to information associating the network service with a network setting of the network service.

(Supplementary Note 12)

The sales management method according to supplementary note 8, wherein in the determination step, determining, as a network setting of the target network service, the network setting that is associated with the target network service and the service level selected by the target user in information associating a network setting with the network service and the service level.

(Supplementary Note 13)

The sales management method according to any one of supplementary notes 8 to 12, wherein in the judgement step, handling, as the target network, a core network accommodating a base station associated with a venue of an event related to the target network service.

(Supplementary Note 14)

The sales management method according to any one of supplementary notes 8 to 13, wherein in the judgement step, judging whether the determined network setting is applicable to the target network, according to a planned number of customers of an event related to the target network service.

(Supplementary Note 15)

A sales management system comprising:

determination means for determining a network setting of a target network service, which is a network service selected by a target user, from among a plurality of network services related to an event;

judgement means for judging whether the determined network setting is applicable to a target network; and notification means for outputting, in response to the judgement, a sales possibility notification indicating whether an access right to the target network service can be sold.

(Supplementary Note 16)

The sales management system according to supplementary note 15, wherein, when a network slice to which the determined network setting is applied can be assigned to the target user, the judgement means judges that the determined network setting is applicable to the target network.

(Supplementary Note 17)

The sales management system according to supplementary note 16, further comprising association means for associating, in response to the target user purchasing an access right to the target network service, the access right purchased by the user with a network slice assigned to the target user.

(Supplementary Note 18)

The sales management system according to supplementary note 15, wherein the determination means determines a network setting of the target network service according to information associating the network service with a network setting of the network service.

(Supplementary Note 19)

The sales management system according to supplementary note 15, wherein the determination means determines, as a network setting of the target network service, the network setting that is associated with the target network service and the service level selected by the target user in information associating a network setting with the network service and the service level.

(Supplementary Note 20)

The sales management system according to any one of supplementary notes 15 to 19, wherein the judgement means handles, as the target network, a core network accommodating a base station associated with a venue of an event related to the target network service.

(Supplementary Note 21)

The sales management system according to any one of supplementary notes 15 to 20, wherein the judgement means judges whether the determined network setting is applicable to the target network, according to a planned number of customers of an event related to the target network service.

(Supplementary Note 22)

A non-transitory computer-readable medium storing a program that causes a computer to execute:

a determination step of determining a network setting of a target network service, which is a network service selected by a target user, from among a plurality of network services related to an event;

a judgement step of judging whether the determined network setting is applicable to a target network; and a notification step of outputting, in response to the judgement, a sales possibility notification indicating whether an access right to the target network service can be sold.

(Supplementary Note 23)

The computer-readable medium according to supplementary note 22, wherein, in the judgement step, when a network slice to which the determined network setting is applied can be assigned to the target user, judging that the determined network setting is applicable to the target network.

(Supplementary Note 24)

The computer-readable medium according to supplementary note 23, wherein the program causes a computer to further execute an association step of associating, in response to the target user purchasing an access right to the target network service, the access right purchased by the user with a network slice allocated to the target user.

(Supplementary Note 25)

The computer-readable medium according to supplementary note 22, wherein, in the determination step, determining a network setting of the target network service according to information associating the network service with a network setting of the network service.

(Supplementary Note 26)

The computer-readable medium according to supplementary note 22, wherein, in the determination step, determining, as a network setting of the target network service, the network setting associated with the target network service and the service level selected by the target user in information associating a network setting with the network service and the service level.

(Supplementary Note 27)

The computer-readable medium according to any one of supplementary notes 22 to 26, wherein, in the judgement step, a core network accommodating a base station associated with a venue of an event related to the target network service is handled as the target network.

(Supplementary Note 28)

The computer-readable medium according to any one of supplementary notes 22 to 27, wherein, in the judgement step, judging whether the determined network setting is applicable to the target network, according to a planned number of customers of an event related to the target network service.

REFERENCE SIGNS LIST

10 USER TERMINAL
20 PURCHASE REQUEST INFORMATION
30 SALES POSSIBILITY NOTIFICATION
40 BASE STATION
50 EVENT VENUE
60 NETWORK MANAGEMENT APPARATUS
70 NETWORK MONITORING APPARATUS
80 NETWORK CONTROL APPARATUS
90 TARGET NETWORK
100 SELECTION SCREEN
110 SELECTION AREA
200 TABLE
202 SERVICE IDENTIFICATION INFORMATION
204 NETWORK SETTINGS
1000 COMPUTER
1020 BUS
1040 PROCESSOR
1060 MEMORY
1080 STORAGE DEVICE
1100 INPUT/OUTPUT INTERFACE
1120 NETWORK INTERFACE
2000 SALES MANAGEMENT APPARATUS
2020 ACQUISITION UNIT
2040 DETERMINATION UNIT

2060 JUDGEMENT UNIT

2080 NOTIFICATION UNIT

The invention claimed is:

1. A network resource management apparatus comprising:

at least one memory that is configured to store instructions; and at least one processor that is configured to execute the instructions to:

acquire a user input performed by a target user that specifies an identifier of a target network service, which is one of a plurality of network services related to an event;

determine, by using correspondence information that associates an identifier of each network service with a network setting corresponding to the network service, the network setting that is associated in the correspondence information with an identifier of the target network service as the network setting of the target network service;

dynamically determine whether an access right to the target network service is available by determining whether the determined network setting is applicable to a target network; and output, in response to the dynamic determination, a resource availability notification indicating that the access right to the target network service is available, so that network utilization efficiency is increased.

2. The network resource management apparatus according to claim 1, wherein the dynamic determination includes, when a network slice to which the determined network setting is applied can be assigned to the target user, determining that the determined network setting is applicable to the target network.

3. The network resource management apparatus according to claim 2, wherein the at least one processor is configured to execute the instructions further to associate, in response to the target user purchasing an access right to the target network service, the access right purchased by the user with a network slice assigned to the target user.

4. The network resource management apparatus according to claim 1, wherein the user input further specifies a service level, wherein the correspondence information associates, for each of a plurality of service levels, the identifier of each network service with the network setting corresponding to the network service, and wherein the determination includes determining, as the network setting of the target network service, the network setting that is associated in the correspondence information with the pair of the target network service and the service level specified by the user input.

5. The network resource management apparatus according to claim 1, wherein a core network accommodating a base station associated with a venue of an event related to the target network service is handled as the target network.

6. The network resource management apparatus according to claim 1, wherein the dynamic determination includes determining whether the determined network setting is applicable to the target network, according to a planned number of customers of an event related to the target network service.

7. A network resource management method being executed by a computer, comprising:

acquiring a user input performed by a target user that specifies an identifier of a target network service, which is one of a plurality of network services related to an event;

determining, by using correspondence information that associates an identifier of each network service with a network setting corresponding to the network service, the network setting that is associated with an identifier of the target network service in the correspondence information as the network setting of the target network service;

dynamically determining whether an access right to the target network service is available by determining whether the determined network setting is applicable to a target network; and outputting, in response to the dynamic determination, a resource availability notification indicating that the access right to the target network service is available, so that network utilization efficiency is increased.

8. The network resource management method according to claim 7, wherein the dynamic determination includes, when a network slice to which the determined network setting is applied can be assigned to the target user, determining that the determined network setting is applicable to the target network.

9. The network resource management method according to claim 8, further comprising associating, in response to the target user purchasing an access right to the target network service, the access right purchased by the user with a network slice assigned to the target user.

10. The network resource management method according to claim 7, wherein the user input further specifies a service level, wherein the correspondence information associates, for each of a plurality of service levels, the identifier of each network service with the network setting corresponding to the network service, and wherein the determination includes determining, as the network setting of the target network service, the network setting that is associated in the correspondence information with the pair of the target network service and the service level specified by the user input.

11. The network resource management method according to claim 7, wherein a core network accommodating a base station associated with a venue of an event related to the target network service is handled as the target network.

12. The network resource management method according to claim 7, wherein the dynamic determination includes determining whether the determined network setting is applicable to the target network, according to a planned number of customers of an event related to the target network service.

13. A network resource management system comprising:

at least one memory that is configured to store instructions; and at least one processor that is configured to execute the instructions to:

acquire a user input performed by a target user that specifies an identifier of a target network service, which is one of a plurality of network services related to an event;

determine, by using correspondence information that associates an identifier of each network service with a network setting corresponding to the network service, the network setting that is associated in the correspondence information with an identifier of the target network service as the network setting of the target network service;

dynamically determine whether an access right to the target network service is available by determining whether the determined network setting is applicable to a target network; and output, in response to the dynamic determination, a resource availability notification indicating that the access right to the target network service is available, so that network utilization efficiency is increased.

14. The network resource management system according to claim 13, wherein, the dynamic determination includes, when a network slice to which the determined network setting is applied can be assigned to the target user, determining that the determined network setting is applicable to the target network.

15. The network resource management system according to claim 14, wherein the at least one processor is configured to execute the instructions further to associate, in response to the target user purchasing an access right to the target network service, the access right purchased by the user with a network slice assigned to the target user.

16. The network resource management system according to claim 13, wherein the user input further specifies a service level, wherein the correspondence information associates, for each of a plurality of service levels, the identifier of each network service with the network setting corresponding to the network service, and wherein the determination includes determining, as the network setting of the target network service, the network setting that is associated in the correspondence information with the pair of the target network service and the service level specified by the user input.

17. The network resource management system according to claim 13, wherein a core network accommodating a base station associated with a venue of an event related to the target network service is handled as the target network.

* * * * *